No. 642,148. Patented Jan. 30, 1900.
J. MUTART.
DIGGING ATTACHMENT FOR SUBSOIL PLOWS.
(Application filed May 29, 1899.)
(No Model.)

Witnesses
M. K. Irwin
J. M. McMaste

Inventor
John Mutart
By his Attorney
Geo. B. Willcox

UNITED STATES PATENT OFFICE.

JOHN MUTART, OF BAY CITY, MICHIGAN, ASSIGNOR OF ONE-HALF TO GEORGE B. WILLCOX, OF SAME PLACE.

DIGGING ATTACHMENT FOR SUBSOIL-PLOWS.

SPECIFICATION forming part of Letters Patent No. 642,148, dated January 30, 1900.

Application filed May 29, 1899. Serial No. 718,761. (No model.)

*To all whom it may concern:*

Be it known that I, JOHN MUTART, a citizen of the United States, residing at Bay City, in the county of Bay and State of Michigan, have invented certain new and useful Improvements in Digging Attachments for Subsoil-Plows; and I do hereby declare the following to be a full, clear, and exact description of the invention, such as will enable others skilled in the art to which it appertains to make and use the same.

My invention relates to diggers for removing sugar-beets, chicory, and other vegetables and roots from the soil; and the improvement consists in certain new and useful attachments for subsoil-plows and the like whereby I accomplish the objects of my invention, which are, first, to provide a digging-shoe that can be readily attached to any of the usual forms of subsoil-plows and that will be adapted to move lengthwise of the rows and pass under the beets, raising them slightly and loosening the soil about them, so that they may be readily picked up; second, to provide means for adjusting the declination or tip of the shoe to suit various classes of work and different kinds of soil, and, third, to provide a subsoil-digger that will be simple in construction, inexpensive to manufacture, and efficient in operation.

My invention will be found illustrated in the accompanying drawings, throughout the several views of which similar figures of reference designate similar parts and devices.

Figure 1:
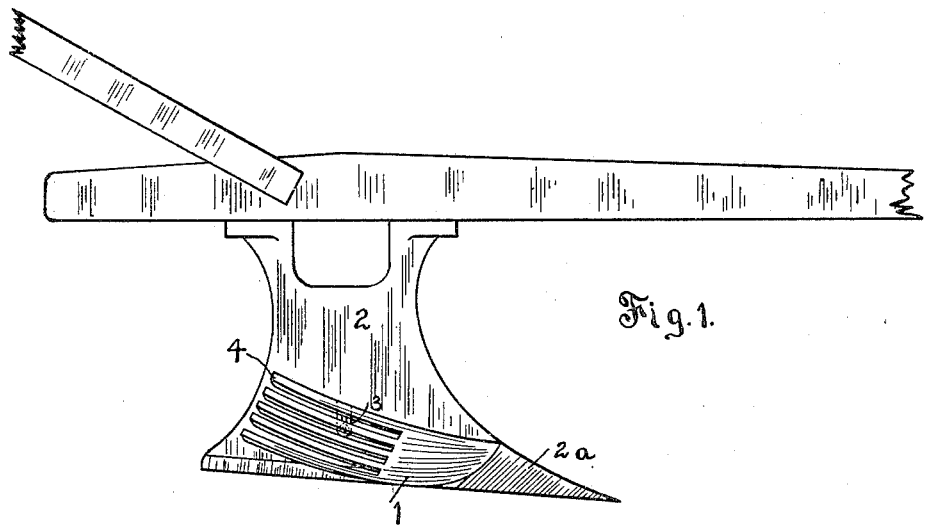
Figure 2:
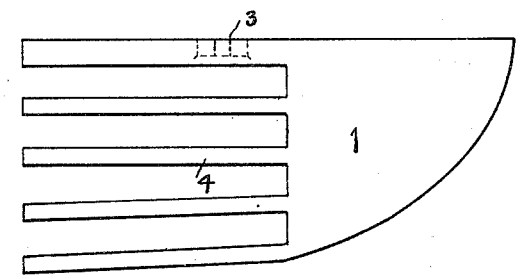
Figure 3:
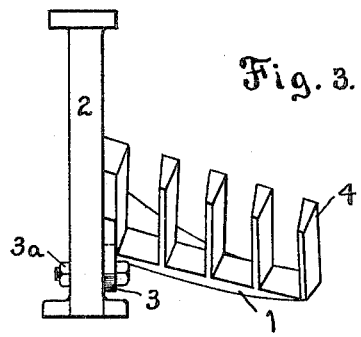

Figure 1 is a side view of a subsoil-plow with my improved digger attached. Fig. 2 is a top view of the digging attachment. Fig. 3 is a rear view of the same, showing its attachment to the standard of the plow.

As is plainly shown in the drawings, the device consists in an approximately horizontal digging-shoe or lifter 1, carried by the vertical standard 2 of a subsoil-plow or similar device and adapted to pass under the roots to be lifted. The front portion of the digging-shoe is preferably of such shape as to fit the rear end of the plow-point $2^a$ and with it to form a smooth surface over which the soil passes as the digger moves forward. The rear end of the digger-shoe has an upward trend and is arranged to lift the roots and the soil surrounding them. After the digger has passed, the loosened soil partly drops back into place and the roots are left partially embedded in loose earth from which they may be readily removed by hand or by suitable machines.

A vertical slotted lug 3 is provided on the inner edge of the digging-shoe 1 and may be attached by a bolt $3^a$ or otherwise to the standard 1. In practice I prefer to provide the rear portion of the digging-shoe 1 with rearwardly-extending fingers 4, through which the soil may drop, as is common in potato-diggers; but the spirit of my invention would still be preserved if the fingers were dispensed with and a smooth-surfaced shoe were employed. The slotted lug 3 admits of raising and lowering the rear end of the shoe, thus regulating the amount of upheaval of the soil to suit various depths of cut. As the digging-shoe is usually applied to one side only of the standard, I prefer to utilize a plate-standard 2, having considerable bearing-surface, so as to transmit the lateral thrust of the digging-shoe to the vertical wall of earth on the opposite side, thus preventing side movement of the plow and consequent unsteadiness in guiding.

By the means above described I provide a simple and inexpensive attachment for subsoil-plows that can be easily and quickly applied, requires but small power, and is efficient in operation.

Having described my invention, what I claim, and desire to secure by Letters Patent, is as follows:

1. A digging attachment for subsoil-plows comprising a laterally-projecting and approximately horizontal shoe having means for varying the elevation of the rear portion of the shoe, substantially as described and for the purpose set forth.

2. A digging attachment for subsoil-plows comprising a laterally-projecting shoe adapted to be removably attached to the plow-standard; the forward part of said shoe being arranged to fit the rear of the plow-point, and means, substantially as described for securing the shoe to the standard and permitting its vertical adjustment relatively thereto.

In testimony whereof I affix my signature in presence of two witnesses.

JOHN MUTART.

Witnesses:
M. H. IRWIN,
DAVID LE FAVOUR.